United States Patent
Li et al.

(10) Patent No.: US 11,451,272 B2
(45) Date of Patent: Sep. 20, 2022

(54) PRECODING PATTERNS FOR SHARED CHANNEL TRANSMISSION REPETITION

(71) Applicant: QUALCOMM Incorporated, San Diego, CA (US)

(72) Inventors: Chih-Ping Li, San Diego, CA (US); Wanshi Chen, San Diego, CA (US); Peter Gaal, San Diego, CA (US); Jing Jiang, San Diego, CA (US); Seyedkianoush Hosseini, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 16/359,766

(22) Filed: Mar. 20, 2019

(65) Prior Publication Data

US 2019/0296809 A1 Sep. 26, 2019

Related U.S. Application Data

(60) Provisional application No. 62/646,299, filed on Mar. 21, 2018.

(51) Int. Cl.
*H04B 7/0456* (2017.01)
*H04W 76/27* (2018.01)
*H04W 72/04* (2009.01)

(52) U.S. Cl.
CPC ...... *H04B 7/0456* (2013.01); *H04W 72/0406* (2013.01); *H04W 76/27* (2018.02)

(58) Field of Classification Search
CPC . H04B 7/0456; H04W 72/0406; H04W 76/27
See application file for complete search history.

(56) References Cited

U.S. PATENT DOCUMENTS

| | | | |
|---|---|---|---|
| 2011/0110304 A1* | 5/2011 | Kuchi | H04L 25/021 370/328 |
| 2014/0029695 A1* | 1/2014 | Liu | H04J 13/00 375/299 |

(Continued)

OTHER PUBLICATIONS

Ericsson: "Extension of PRB Bundling for DL," 3GPP Draft; R1-1802739 Extension of PRB Bundling for DL, 3rd Generation Partnership Project (3GPP), Mobile Competence Centre; 650, Route Des-Lucioles; F-06921 Sophia-Antipolis Cedex; France, vol. RAN WG1, No. Athens, Greece; Feb. 26, 2018-Mar. 2, 2018, Feb. 17, 2018, XP051398171, 3 pages, Retrieved from the Internet: URL: http://www.3gpp.org/ftp/tsg%5Fran/WG1%5FRL1/TSGR1%5F92/Docs/ [retrieved on Feb. 17, 2018] p. 1.

(Continued)

*Primary Examiner* — Hoang-Chuong Q Vu
(74) *Attorney, Agent, or Firm* — Patterson & Sheridan, L.L.P

(57) ABSTRACT

Certain aspects of the present disclosure provide techniques for applying precoding patterns to shared channel transmission repetitions. In one example, a method of transmitting data from a device in a wireless communication network, includes: determining a number of repetitions to transmit data in the wireless communication network; determining a precoding pattern that specifies a precoder to be applied to each repetition of the number of repetitions; and transmitting the data according to the number of repetitions and according to the precoding pattern.

30 Claims, 11 Drawing Sheets

(56) References Cited

U.S. PATENT DOCUMENTS

| | | | | |
|---|---|---|---|---|
| 2017/0041052 | A1* | 2/2017 | Blankenship | H04L 1/08 |
| 2017/0134881 | A1* | 5/2017 | Oh | H04W 56/001 |
| 2017/0244506 | A1* | 8/2017 | Park | H04J 11/005 |
| 2017/0294999 | A1* | 10/2017 | Patel | H04L 1/0018 |
| 2017/0302415 | A1* | 10/2017 | Park | H04B 7/0669 |
| 2017/0310414 | A1* | 10/2017 | Park | H04L 5/0007 |
| 2017/0324526 | A1* | 11/2017 | Park | H04L 27/2646 |
| 2017/0325212 | A1* | 11/2017 | Thurfjell | H04B 7/0617 |
| 2018/0167252 | A1* | 6/2018 | Wang | H04L 27/2613 |
| 2019/0074885 | A1* | 3/2019 | Chen | H04B 7/0478 |
| 2019/0103950 | A1* | 4/2019 | Liu | H04L 5/0051 |
| 2019/0109700 | A1* | 4/2019 | Liu | H04L 27/2692 |
| 2019/0115657 | A1* | 4/2019 | Hwang | H04B 7/0689 |
| 2019/0280748 | A1* | 9/2019 | Cirkic | H04B 7/0465 |
| 2019/0357159 | A1* | 11/2019 | Pan | H04L 1/1861 |
| 2020/0358509 | A1* | 11/2020 | Wernersson | H04B 7/0486 |
| 2021/0226748 | A1* | 7/2021 | Frenne | H04L 25/0204 |

OTHER PUBLICATIONS

International Search Report and Written Opinion—PCT/US2019/023409—ISA/EPO—dated Jun. 19, 2019.
NTT Docomo et al: "Enhancements on Multi-TRP/Panel Transmission", 3GPP Draft; R1-1902812 Enhancements On Multi-TRP_Panel Transmission, 3rd Generation Partnership Project (3GPP), Mobile Competence Centre; 650, Route Des Lucioles; F-06921 Sophia-Antipolis Cedex France, vol. RAN WG1, No. Athens, Greece; Feb. 25, 2019-Mar. 1, 2019, Feb. 16, 2019, XP051600507, 25 Pages.

* cited by examiner

PRECODING PATTERNS FOR SHARED CHANNEL TRANSMISSION REPETITION

CROSS-REFERENCE TO RELATED APPLICATIONS

This Applications claims the benefit of U.S. Provisional Patent Application No. 62/646,299, filed Mar. 21, 2018, the contents of which are incorporated herein in their entirety.

INTRODUCTION

Field of the Disclosure

Aspects of the present disclosure relate to wireless communications, and more particularly, to techniques for applying precoding patterns to shared channel transmission repetitions.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

A first aspect provides a method of transmitting data from a device in a wireless communication network, including: determining a number of repetitions to transmit data in the wireless communication network; determining a precoding pattern that specifies a precoder to be applied to each repetition of the number of repetitions; and transmitting the data according to the number of repetitions and according to the precoding pattern.

A second aspect provides a non-transitory computer-readable medium comprising instructions that, when executed by a processor of a device, cause the device to perform a method of transmitting data from a device in a wireless communication network, the method including: determining a number of repetitions to transmit data in the wireless communication network; determining a precoding pattern that specifies a precoder to be applied to each repetition of the number of repetitions; and transmitting the data according to the number of repetitions and according to the precoding pattern.

A third aspect provides a device configured to transmit data in a wireless communication network, including: a memory comprising executable instructions; and a processor in data communication with the memory and configured to execute the executable instructions to cause the device to: determine a number of repetitions to transmit data in the wireless communication network; determine a precoding pattern that specifies a precoder to be applied to each repetition of the number of repetitions; and transmit the data according to the number of repetitions and according to the precoding pattern.

A fourth aspect provides a device configured to transmit data in a wireless communication network, including: means for determining a number of repetitions to transmit data in the wireless communication network; means for determining a precoding pattern that specifies a precoder to be applied to each repetition of the number of repetitions; and means for transmitting the data according to the number of repetitions and according to the precoding pattern.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
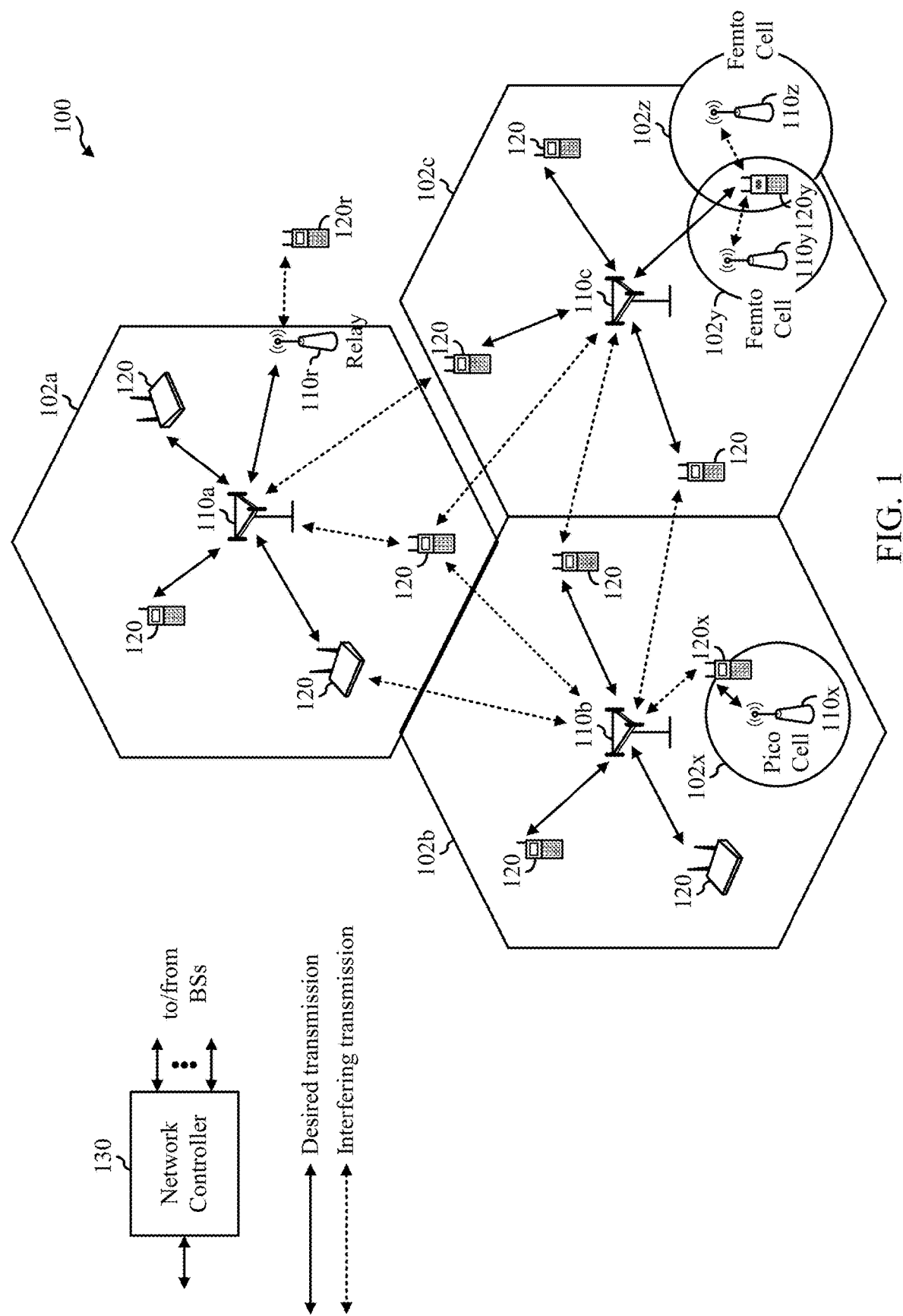
FIG. 1 is a block diagram conceptually illustrating an example telecommunications system, in accordance with certain aspects of the present disclosure.

Aspects of the present disclosure provide apparatus, methods, processing systems, and computer readable mediums for applying precoding patters to shared channel transmission repetitions to improve the reliability of data transmissions, such as repetitions on the physical downlink shared channel (PDSCH) and physical uplink shared channel (PUSCH).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
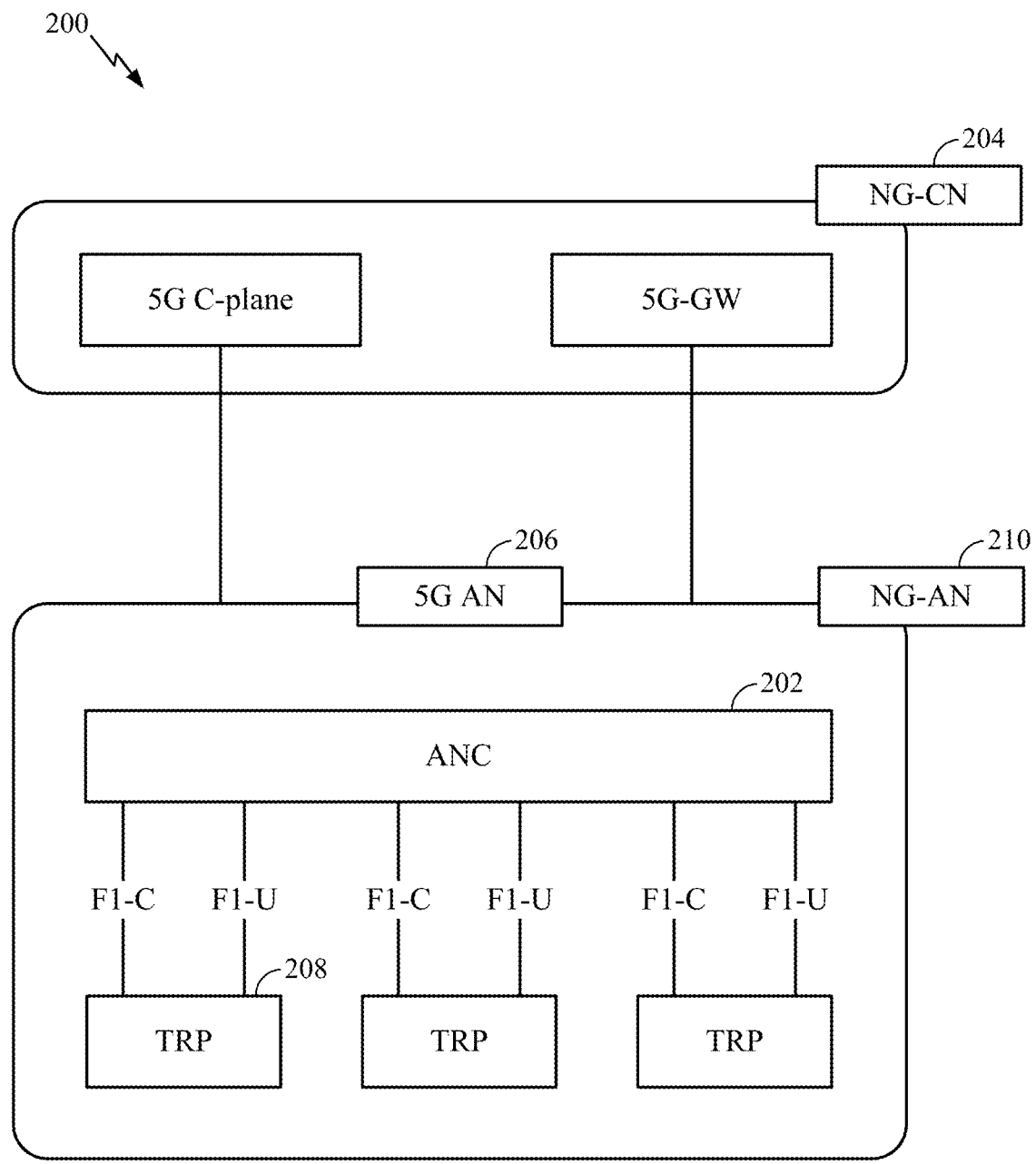
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
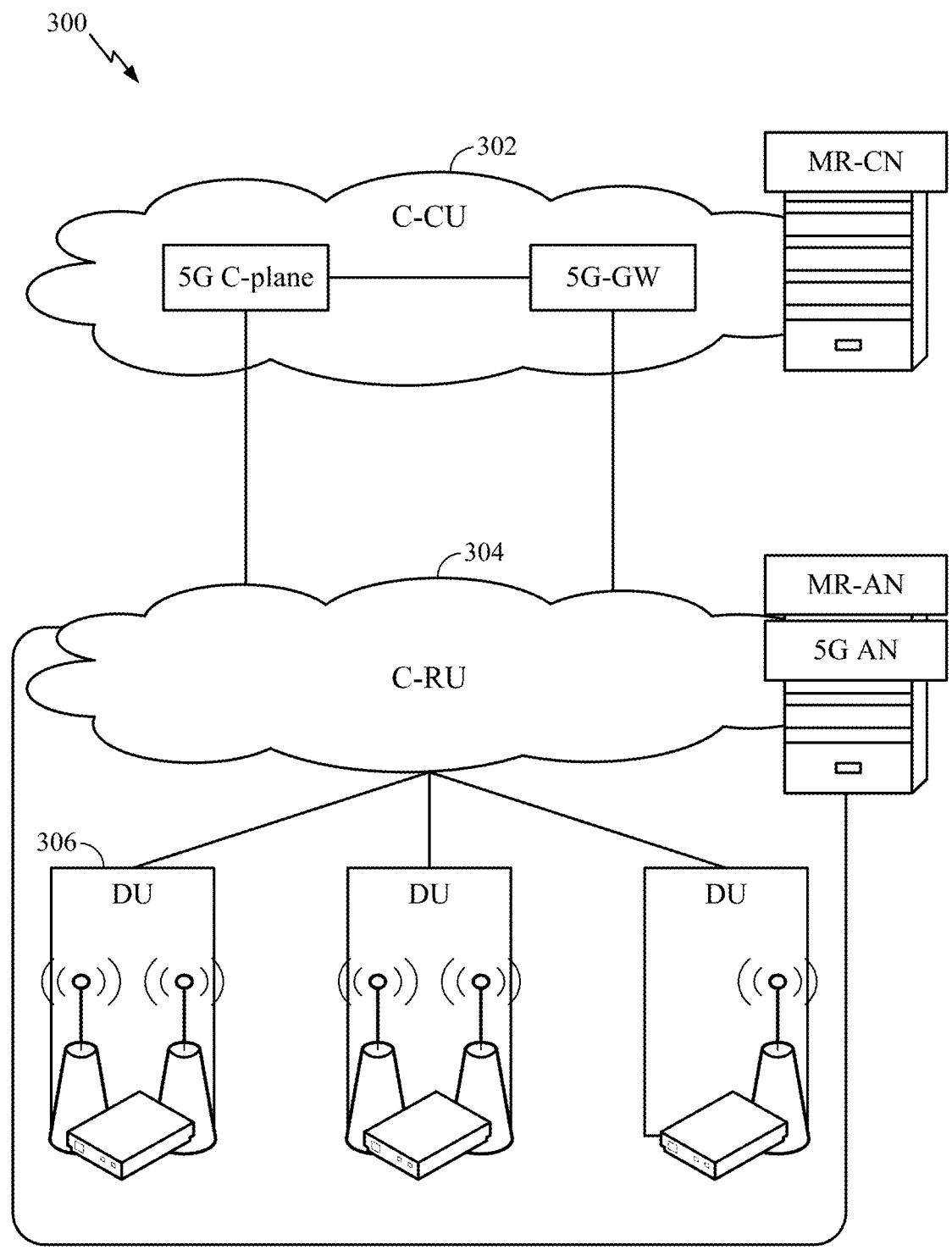
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
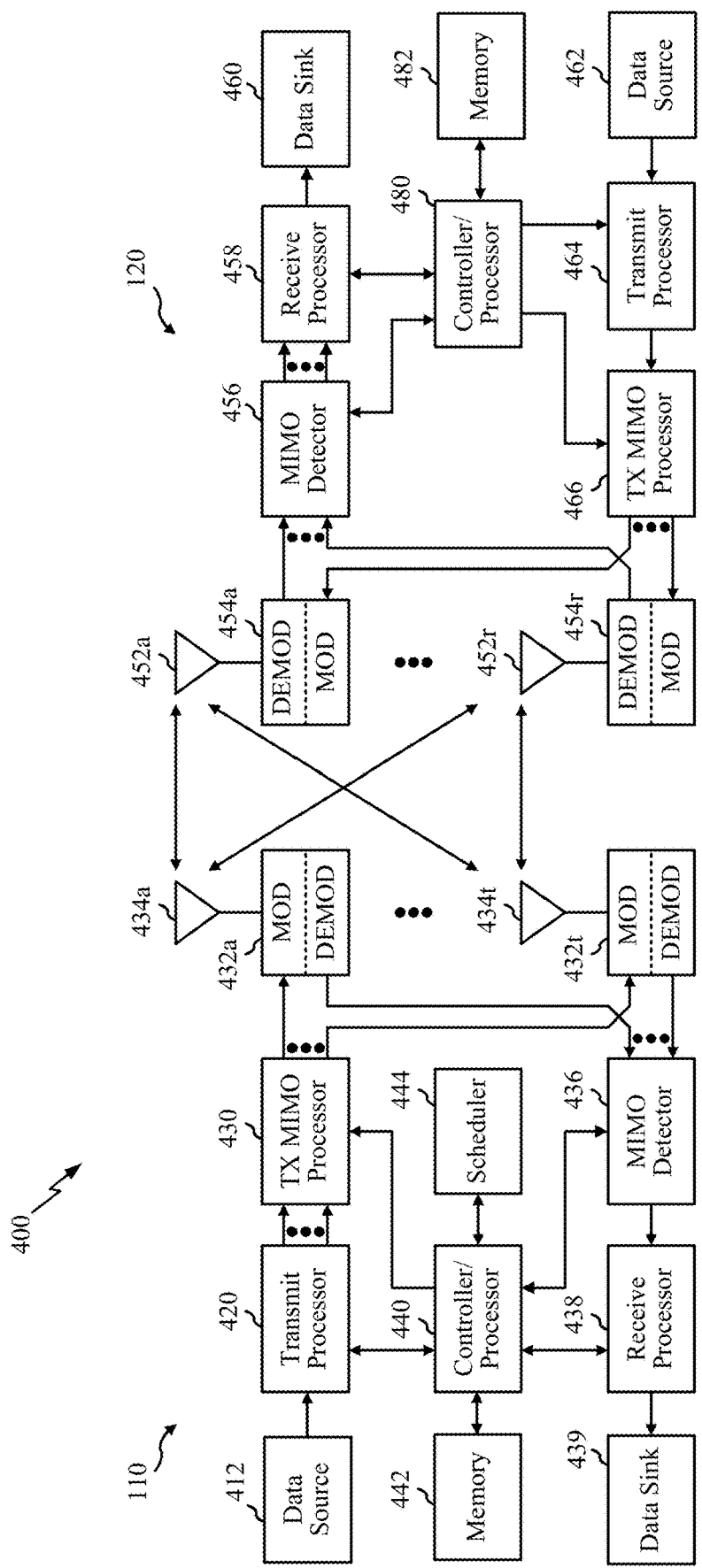
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein, such as illustrated and described below with respect to FIGS. 8 and 9A-9D.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
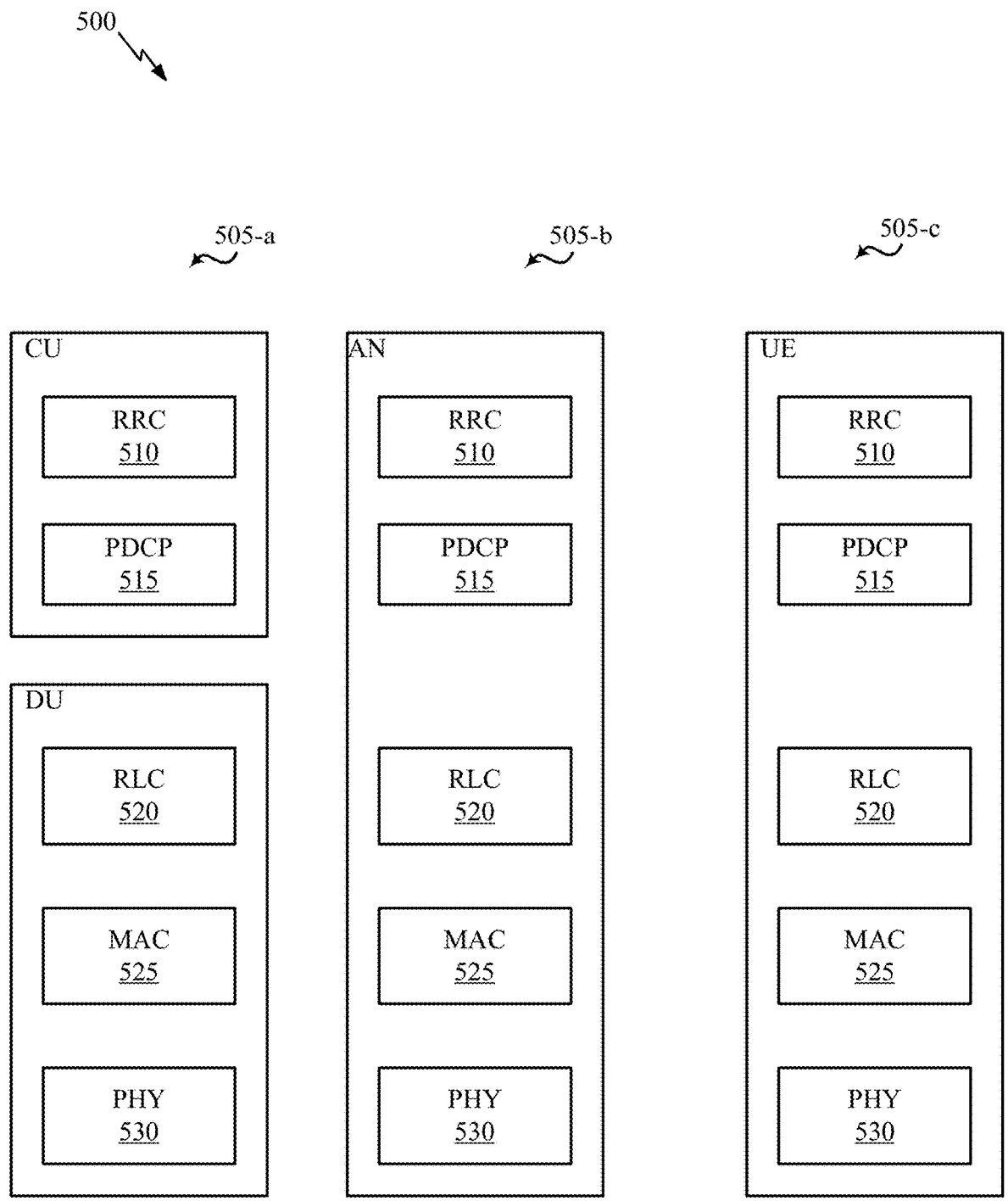
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530.

In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
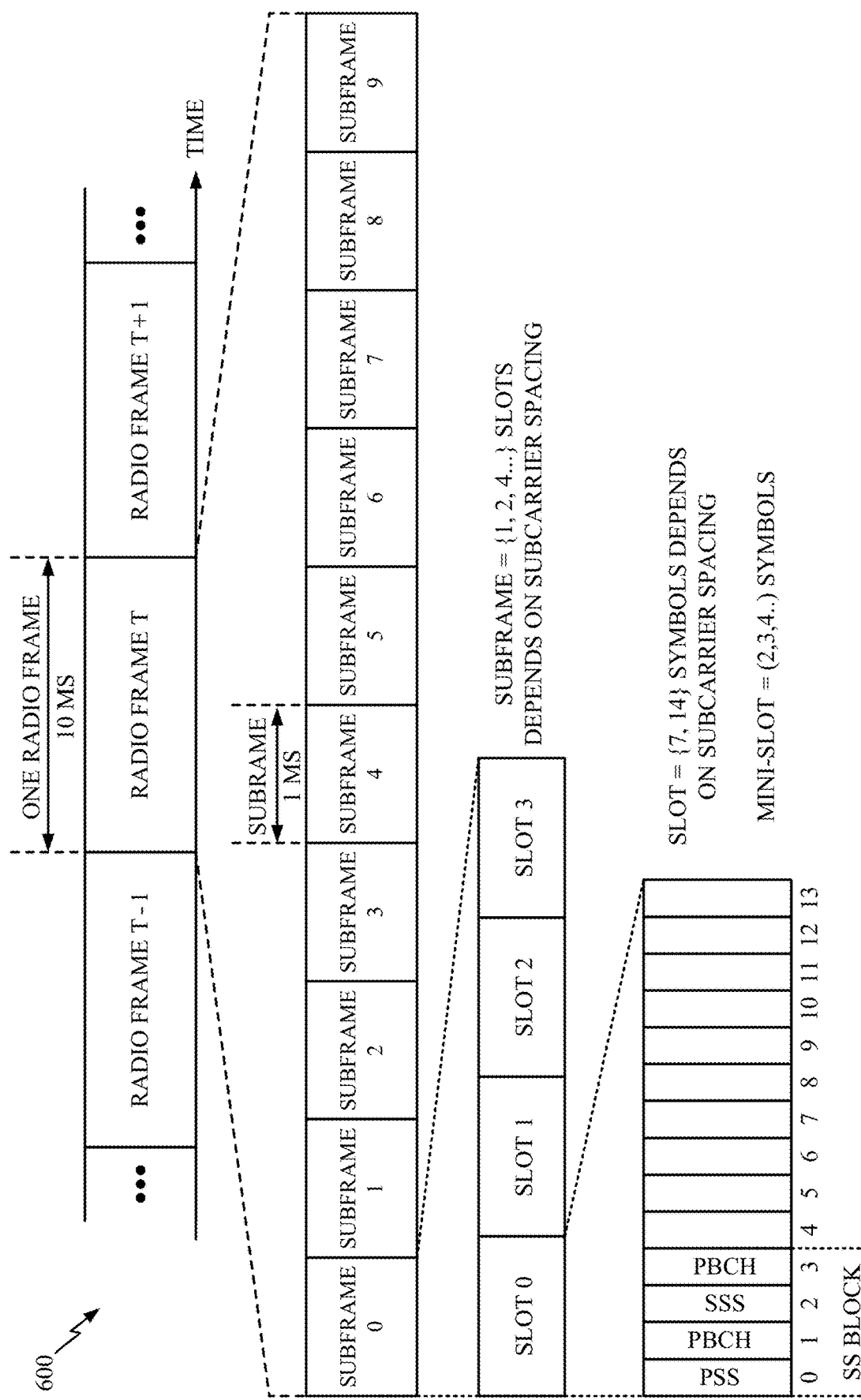
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Precoding Patterns for Shared Channel Transmission Repetition

To improve data transmission reliability, it may be desirable to repeat data transmissions between a transmitting device and a receiving device. Such repeated data transmissions improve the likelihood that the receiver receives at least one correct version of the data. This may be particularly useful in noisy radio environments or where channel conditions are poor.

Precoding is a form of spatial diversity processing that can be used to further improve the reliability of repeated data transmissions (e.g., in beamforming applications). Generally speaking, precoding may be implemented with single-stream or multi-stream (or multi-layer) transmission in multi-antenna wireless communication systems. For example, in single-stream beamforming, the same signal is emitted from a plurality of transmit antennas with appropriate weighting (e.g., phase and amplitude) such that the signal power is maximized at the receiver. However, when the receiver has multiple antennas, single-stream beamforming may not be able to simultaneously maximize the signal level at all of the receive antennas. Thus, in order to maximize the throughput in multiple receive antenna systems, multi-stream transmission is generally preferred.

In point-to-point systems, precoding means that multiple data streams are emitted from the transmit antennas with independent and appropriate weightings to maximize the signal level at all of the receive antennas such that the link throughput is maximized at the receiver. This method may be particularly useful, for example, in maximizing total throughput in multi-user MIMO applications, where the data streams are intended for different users. These applications may be referred to as spatial division multiple access (SDMA). Precoding in the downlink of cellular networks, sometimes referred to as network MIMO or coordinated multipoint (CoMP), is a generalized form of multi-user MIMO that can be implemented using the techniques described herein.

FIGS. 7A-7D illustrate examples of repeating transmissions on shared channels during inter-slot and intra-slot time periods.

Figure 7A:
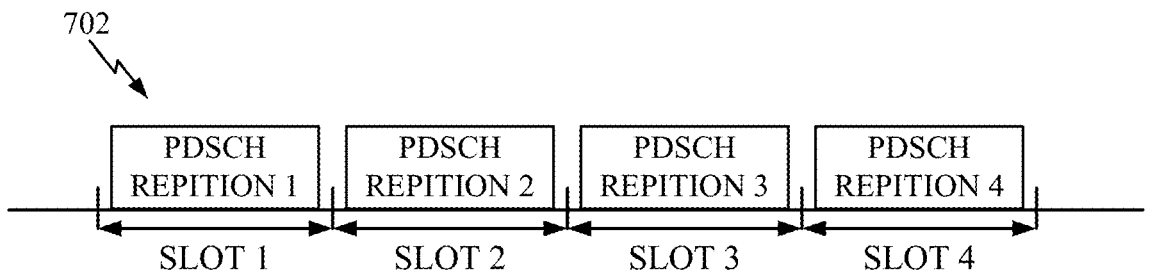
FIGS. 7A-7D illustrate examples of repeating transmissions on shared channels during inter-slot and intra-slot time periods.

For example. FIG. 7A illustrates an example of repeating transmissions 702 on a physical downlink shared channel (PDSCH). In this example, the PDSCH data is repeated four times, once in each of four successive slots (Slots 1-4). This type of repetition may be referred to as inter-slot repetition. As explained above, in some instances (e.g., LTE), each slot may be one half of a subframe, i.e., one half of a transmission time interval (TTI). In other instance (e.g., NR), each slot may be one TTI. Note that the relative size of each PDSCH repetition within each slot in FIG. 7A is not intended to be representative of the proportion of the time or data capacity used by the PDSCH repetition in each slot.

Figure 7B:
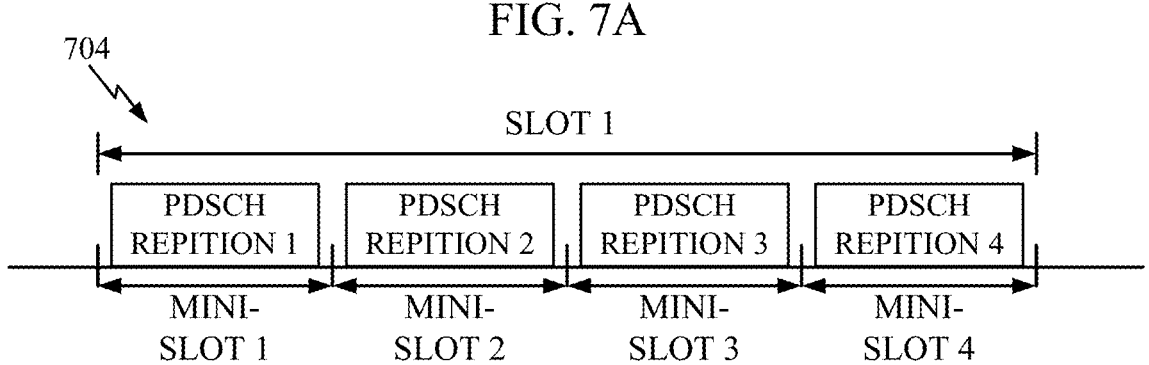

As another example, FIG. 7B illustrates an example of repeating transmissions 704 on a physical downlink shared channel (PDSCH) within a single slot. This type of repetition may be referred to as intra-slot repetition. In this example, each of the PDSCH repetitions takes place within a mini-slot i.e., a portion of a single slot. In this example, there are four mini-slots within Slot 1, but in other examples there may be any number of mini-slots within a single slot. In the LTE context, the mini-slots may correspond to shortened TTIs, i.e., sTTIs. In NR, TTIs are scalable by design.

While FIGS. 7A and 7B are illustrated with PDSCH repetitions, these example repetition patterns are equally applicable to PUSCH repetitions or repetitions of other channels in other instances.

Figure 7C:
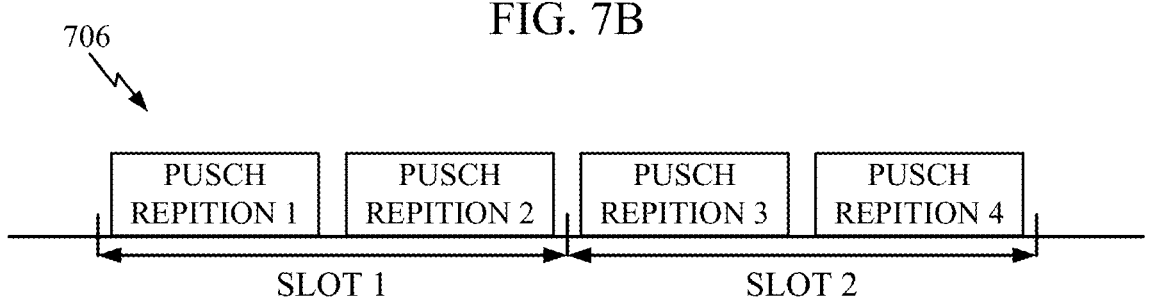

As another example, FIG. 7C illustrates an example of repeating transmissions 706 on a physical uplink shared channel (PUSCH) both within a single slot and between slots. This type of repetition may be referred to as hybrid-slot repetition. In this example, two of the PUSCH repetitions takes place within Slot 1 and two additional repetitions take place within Slot 2. In this example, there are two mini-slots within Slot 1 and within Slot 2 (not shown), but in other examples there may be any number of mini-slots within a single slot.

While FIG. 7C is illustrated with PUSCH repetitions, these example repetition patterns are equally applicable to PDSCH repetitions or repetitions of other channels in other instances.

Figure 7D:
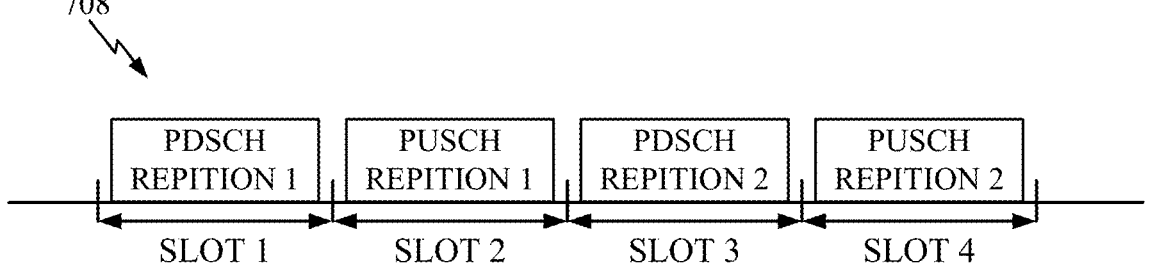

As another example, FIG. 7D illustrates an example of repeating transmissions 708 on a physical downlink shared channel (PDSCH) and a physical uplink shared channel (PUSCH). In this example, the PDSCH data is repeated two times, once in each of two non-successive slots (Slots 1 and 3). Further, the PUSCH data is repeated two times, once in each of two other non-successive slots (Slots 2 and 4). This type of repetition may be referred to as interleaved repetition.

While FIG. 7D is illustrated with PDSCH and PUSCH data transmissions interleaved in successive slots, in other examples the PDSCH and PUSCH data transmissions (or transmissions of other channels or subchannels) may be interleaved within a single slot, e.g., within mini-slots as depicted in FIG. 711.

In each of the examples illustrated in FIGS. 7A-7D, there are four total repetitions of data depicted. In other examples, there may be more or fewer repetitions. Further, in FIGS. 74-7C, each repetition is the same type of data (i.e., PDSCH or PUSCH), while in FIG. 7D there are different types of data (i.e., PDSCH and PUSCH). In other examples, there may be different configurations.

Figure 8:
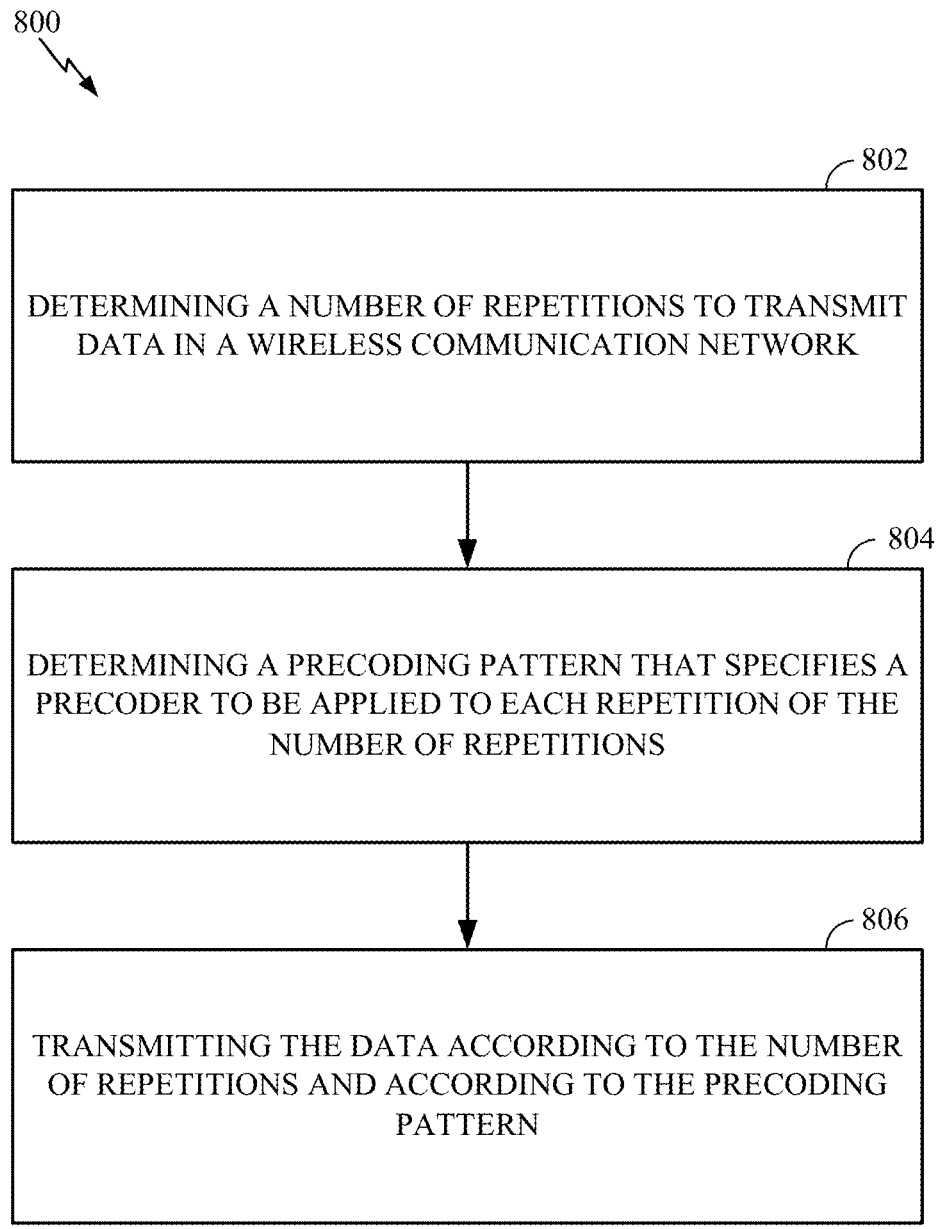
FIG. 8 illustrates an example method for transmitting data from a device in a wireless communication network.

FIG. 8 illustrates an example method 800 for transmitting data from a device in a wireless communication network. For example, method 800 may be performed by a user equipment, such as described above with respect to FIG. 1 and FIG. 4, or by a transmission device, as described below with respect to FIGS. 10 and 11.

Method 800 begins at step 802 where a number of repetitions to transmit data in a wireless communication network is determined. For example, as described above with respect to FIG. 7, data may be repeatedly transmitted on shared channels in one or more slots. In some cases, the number of repetitions is based on channel conditions. For example, more repetitions may be determined when channel conditions are poor and fewer repetitions may be determined when channel conditions are good. In some cases, there may be a default number of repetitions, which may be deviated from based on channel conditions, mobility of a transmission device, or other conditions that may affect the likelihood of the data transmission being successfully received by an intended receiver.

Method 800 then proceeds to step 804 where a precoding pattern is determined that specifies a precoder to be applied to each repetition of the number of repetitions. For example, as described below with respect to FIGS. 9A-9D, a precoding pattern may define different precoders that are used for different channels or subchannels. The precoders may be, for example, precoding matrices that are used to improve spatial diversity techniques. In some cases, the precoding pattern is selected based on a condition of the device. For example, the condition may relate to mobility of the device (e.g., whether it is moving or not, how fast it is moving, in what direction it is moving, etc.). In some cases, determining a precoding pattern includes selecting a precoding pattern from a plurality of preconfigured precoding pattern stored in a memory of a device, such as a UE or base station, as described above with respect to FIGS. 1 and 4, or a transmission device or reception device, as described below with respect to FIGS. 10 and 11.

Method 800 then proceeds to step 806 where the data is transmitted according to the number of repetitions and according to the precoding pattern. For example, as described below with respect to FIGS. 9A-9D, many different precoding patterns can be applied based on the number of channels or subchannels and the number repetitions.

In some cases, the precoding pattern specifies at least a first precoder associated with a first subchannel and a second precoder associated with a second subchannel.

Further, in some cases transmitting the data according to the precoding pattern comprises interleaving transmissions of the data (e.g., repetitions) on the first subchannel with transmissions of the data on the second subchannel, while in other cases transmitting the data according to the precoding pattern comprises repeating all transmissions of the data on the first subchannel before any transmissions of the data on the second subchannel.

In some cases, at least one of the first subchannel and the second subchannel comprises a physical downlink shared channel (PDSCH). In further cases, at least one of the first channel and the second channel comprises a physical uplink shared channel (PUSCH). In other cases, at least one of the first subchannel and the second subchannel may be other channels or subchannels associated with a radio access technology, such as LTE or NR, as described above. Further as described with respect to FIGS. 9A-9D, the data may be transmitted during at least one of a plurality of slots, a plurality of mini-slots within a single slot, or a plurality of mini-slots across several slots.

Though not shown in FIG. 8, method 800 may also include performing a number of channel estimations for use in the transmitting, wherein the number of channel estimations depends on a number of different precoders specified in the precoding pattern.

Method 800 may also include receiving a plurality of precoding patterns. For example, a user equipment may receive preconfigured precoding patterns from a network device, such as a base station. In some cases, the plurality of precoding patterns are received via radio resource control (RRC) signaling.

Method 800 may also include receiving signaling indicating which of the precoding patterns to use. In some cases, the signaling is received via downlink control information (DCI).

The type of spatial diversity implemented using method 800 improves the reliability of the data transmission on the receiving end. For example, by taking advantage of channel-specific conditions, the various precoders may improve the reliability of the data transmissions from transmission device 1001 to reception device 1003. Improving the reliability of the data transmission beneficially reduces retransmission of the data due to errors, which leads to better utilization of wireless resources and faster and more complete data transmission. Further, improving the reliability of the data transmission beneficially reduces processing load and power usage at each of transmission device 1001 and a reception device 1003. Further yet, improving the reliability of the data transmission beneficially provides more access to shared channel resources in multi-device environments, such as in the case of a radio access network as described with respect to FIG. 1.

Figure 9A:
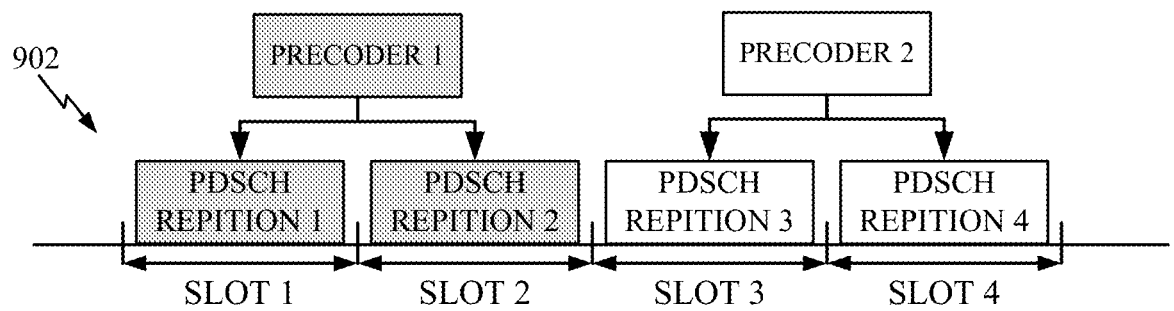
FIGS. 9A-9D illustrate examples of repeating transmissions on shared channels during inter-slot and intra-slot time periods using different precoder patterns.

FIGS. 9A-91) illustrate examples of repeating transmissions on shared channels during inter-slot and intra-slot time periods using different precoder patterns.

For example, FIG. 9A illustrates an example of repeating transmissions 902 on a physical downlink shared channel (PDSCH) according to a precoding pattern. Like the example in FIG. 7A, here the PDSCH data is repeated four times, once in each of four successive slots (Slots 1-4) (i.e., inter-slot repetition). However, here, PDSCH Repetition 1 and PDSCH Repetition 2 (during Slots 1 and 2) are precoded using Precoder 1 while PDSCH Repetition 3 and PDSCH Repetition 4 (during Slots 3 and 4) are precoded using Precoder 2. Thus, in this precoding pattern, all repetitions associated with a particular precoder (e.g., Precoder 1) are transmitted before all repetitions with another precoder (e.g., Precoder 2). Precoder 1 may be a first precoding matrix associated with a first physical subchannel and Precoder 2 may be a second precoding matrix associated with a second physical subchannel.

In the example depicted in FIG. 9A, it may be necessary to perform at least two channel estimations i.e., one for each precoder and associated physical subchannel. This is especially true where, for example, a transmission device like a UE is mobile. Because a mobile transmission device will experience changing channel conditions based on its mobility, transmission performance will be improved if a precoder is based on current channel conditions.

Figure 9B:
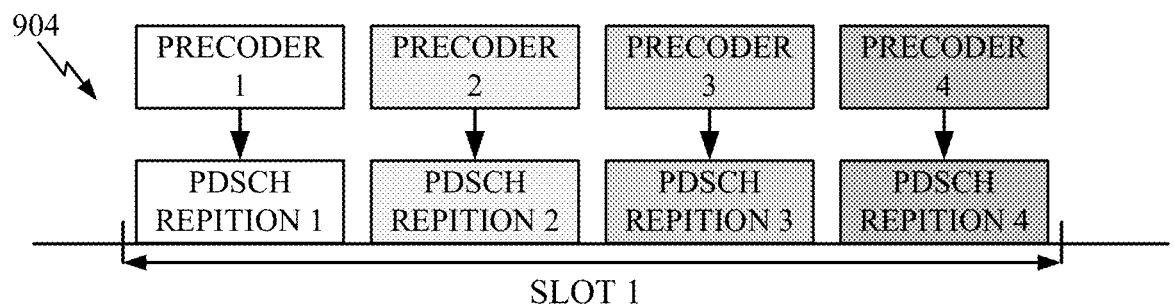

As another example, FIG. 9B illustrates an example of repeating transmissions 904 on a physical downlink shared channel (PDSCH) within a single slot (i.e., intra-slot repetition) according to another precoding pattern. Like in FIG. 7B, in this example, each of the PDSCH repetitions takes place within a mini-slot within Slot 1. However, here, PDSCH Repetitions 1-4 are precoded using Precoders 1-4, respectively. Thus, in this example, each repetition uses a different precoder and no precoders are repeated during the repetitions. As above, Precoders 1-4 may each be associated with a different precoding matrix and a different physical channel or subchannel.

In the example depicted in FIG. 9B, it may be necessary to perform at least four channel estimations i.e., one for each precoder and associated physical channel or subchannel. While there may be a minor increase in transmission overhead to perform the channel estimations, generally this will be more than offset by the improved reliability of the data transmission (e.g., in the avoidance of need for retransmission).

While FIGS. 9A and 9B are illustrated with PDSCH repetitions, these example repetition patterns are equally applicable to PUSCH repetitions or repetitions of other channels in other instances.

Figure 9C:
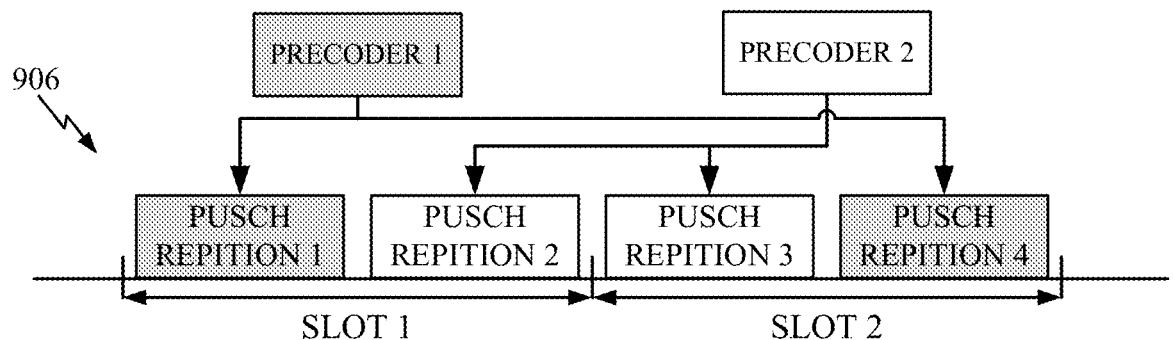

As another example, FIG. 9C illustrates an example of repeating transmissions 906 on a physical uplink shared channel (PUSCH) both within a single slot and between slots (i.e., hybrid-slot repetition) according to another precoding pattern. As above in FIG. 7C, two of the PUSCH repetitions takes place within Slot 1 and two additional repetitions take place within Slot 2. However, in this example, each of the PUSCH repetitions during Slot 1 is transmitted according to different precoders associated with different physical channels or subchannels. Specifically, in this example PUSCH Repetition 1 is transmitted with Precoder 1 on a first physical subchannel associated with Precoder 1, and PUSCH Repetition 2 is transmitted on a second physical subchannel associated with Precoder 2. Further, according to this example precoding pattern, each repetition during each slot is transmitted with a different precoder, like in FIG. 9B, though here the precoders are repeated during the transmissions of the total number the repetitions, unlike in FIG. 9B.

In the example depicted in FIG. 9C, it may be necessary to perform at least two channel estimations i.e., one for each precoder and associated physical channel or subchannel. However, three channel estimations may be performed in some cases depending on the timing of the repetitions and the status of the transmission device. For example, where a transmission device (e.g., a UE) is mobile, a first channel estimation may be performed before PUSCH Repetition 1, a second channel estimation may be performed before PUSCH Repetitions 2 and 3, and then a third channel estimation may be performed before PUSCH Repetition 4. The third channel estimation may be necessary because the channel conditions may have changed significantly between PUSCH 1 and PUSCH 4 (i.e., where the repetitions are non-consecutive) according to the depicted precoding pattern.

While FIG. 9C is illustrated with PUSCH repetitions, these example repetition patterns are equally applicable to PDSCH repetitions or repetitions of other channels in other instances.

Figure 9D:
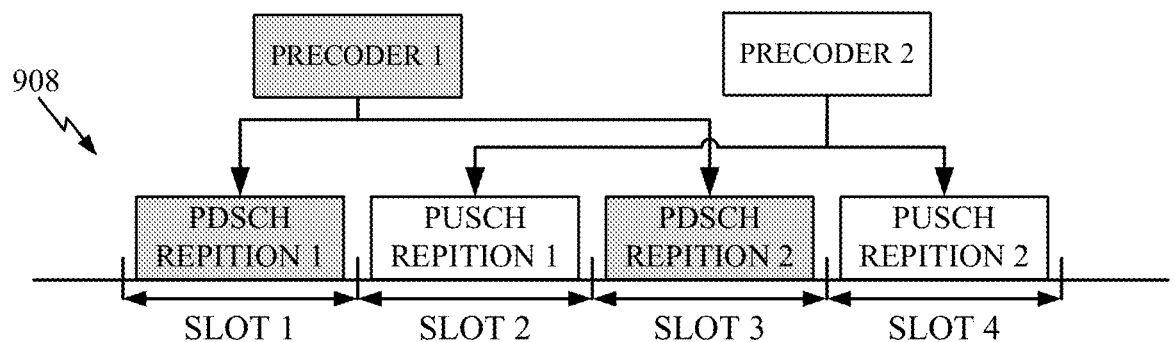

As another example, FIG. 9D illustrates an example of repeating transmissions 908 on different channels, such as the physical downlink shared channel (PDSCH) and the physical uplink shared channel (PUSCH), as may be implemented in a time division duplex (TDD) scheme. In this example, the PDSCH data is repeated two times, once in each of two non-consecutive slots (Slots 1 and 3). Further, the PUSCH data is repeated two times, once in each of two other non-consecutive slots (Slots 2 and 4). Thus, in this example, the repetition of different logical channels (here, PDSCH and PUSCH) is interleaved on different physical channels (here, physical subchannels associated with Precoder 1 and Precoder 2). Note that in this example the PDSCH and PUSCH data transmissions are interleaved in successive slots, but in other examples the PDSCH and PUSCH data transmissions may be interleaved within a single slots, e.g., within mini-slots. Further, while in this example the interleaving pattern is an every-other pattern, with respect to both the physical and logical channels, in other examples the interleaving pattern may be different. For example, if there was priority for downlink shared data, then a repetition pattern may include more PDSCH repetitions than PUSCH repetitions. In other words, the number of repetitions for each channel or subchannel need not be equal.

In the example depicted in FIG. 9D, it may be necessary to perform at least two channel estimations i.e., one for each precoder and associated physical channel or subchannel. For example, this may be the case where the transmission device is not mobile. However, four channel estimations may be performed in some cases depending on the timing of the repetitions and the mobility of the transmission device. For example, where a transmission device (e.g., a UE) is mobile, a first channel estimation may be performed before PDSCH Repetition 1, a second channel estimation may be performed before PUSCH Repetition 1, a third channel estimation may be performed before PDSCH Repetition 2, and a fourth channel estimation may be performed before PUSCH Repetition 2. Though there are only two precoders in this example, the third and fourth channel estimations may be necessary because the channel conditions may have changed significantly between, for example, PDSCH 1 and PDSCH 2, which are non-consecutive according to the depicted precoding pattern.

While FIG. 9D is illustrated with PDSCH and PUSCH data transmissions interleaved in successive slots, in other examples the PDSCH and PUSCH data transmissions (or transmissions of other channels or subchannels) may be interleaved within a single slot, e.g., within mini-slots as depicted in FIG. 9B.

Further, in other instances, the interleaved repetitions in FIG. 9D may all be the same type of channel or subchannel. For example, Slot 2, could be a second repetition of the PDSCH data according to Precoder 2; Slot 3 could be a third repetition of the PDSCH data according to Precoder 1; and Slot 4 could be a fourth repetition of the PDSCH data according to Precoder 2. As yet another example of interleaving repetitions of data from the same channel using multiple precoders, Slot 1, could be a first repetition of the PUSCH data according to Precoder 1; Slot 2 could be a second repetition of the PUSCH data according to Precoder 2; Slot 3 could be a third repetition of PUSCH data according to Precoder 1; and Slot 4 could be a fourth repetition of the PUSCH data according to Precoder 2. Other examples are possible.

In each of the examples illustrated in FIGS. 9A-9D, there are four total repetitions of data. In other examples, there may be more or fewer repetitions. For example, there may be two repetitions, or eight repetitions, or sixteen repetitions, or any other number as per a particular implementation. In some cases, the number of repetitions may be dynamically changed according to channel conditions where more repetitions are selected when channel conditions are poor and fewer repetitions are selected when channel conditions are good.

In FIGS. 9A-9C, each repetition is on the same type of channel (i.e., PDSCH or PUSCH), while in FIG. 9D the repetitions occur on different types of channels (i.e., PDSCH and PUSCH). In other examples, there may be different configurations, for example, using different physical channels or subchannels associated with a particular radio access technology, such as LTE or NR. For example, repetition of control channel data, such as the physical downlink control channel (PDCCH), physical uplink control channel (PUCCH), the group common PDCCH (GC PDCCH), and others.

In each of the examples illustrated in FIGS. 9A-9D, there are either two or four precoders. In other examples, there may be different numbers of precoders. For example, there could be three, six, or eight precoders associated with three, six, or eight channels or subchannels. In some instances, there may be as many precoders as there are antenna elements associated with a transmitting device. The examples depicted in in FIGS. 9A-9D are not intended to be limiting of the number or arrangement of precoders.

Figure 10:
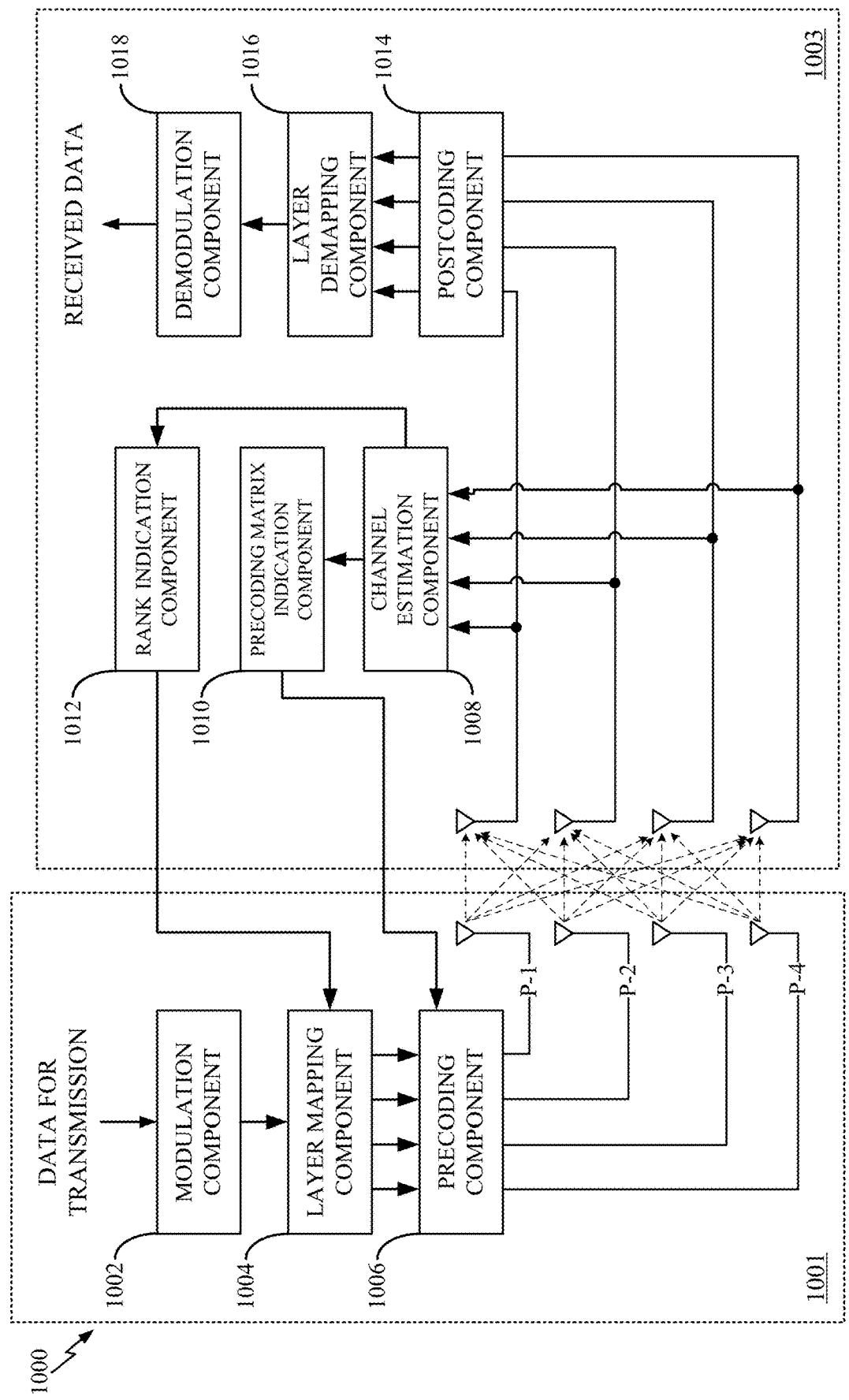
FIG. 10 illustrates aspects of a data transmission system including a precoding component.

FIG. 10 illustrates aspects of a data transmission system 1000 including transmission device 1001 and reception device 1003. Transmission device 1001 may be configured to perform the method described above with respect to FIG. 8.

As illustrated, modulation component 1002 of transmission device 1001 receives data for transmission (e.g., a bit stream) and modulates the data into symbols for transmission. Layer mapping component 1004 then maps the symbols to layers (e.g., logical layers and/or physical layers) for transmission. In some examples, each physical layer may be associated with a subchannel and an individual antenna element. Finally precoding component 1006 may precode the symbols using one or more precoders based on precoding patterns, for example as described above with respect to FIGS. 9A-9D. In some examples, the precoders are based on precoding data (e.g., a precoding matrix indicator) received from precoding matrix indication component 1010. In other examples, the precoders may be preconfigured and stored in a memory of a device, such as transmission device 1001.

In some cases, precoding component 1006 of transmission device 1001 may apply different precoding patterns to the data for transmission. Where the data for transmission will be repeated (e.g., as discussed above with respect to FIGS. 9A-9D), precoding component 1006 may apply different precoders to the data for transmission based on different physical channels or subchannels on which the data will be transmitted. For example, the data may be transmitted on one or more of physical channels or subchannels P-1 to P-4, and each physical channel or subchannel may have its own precoder.

Reception device 1003 may generate channel estimation data based on reference data transmitted by transmission device 1001. For example, reception device 1003 may receive uplink physical reference signals, such as demodulation reference signals (DMRS), which are associated with transmissions on the physical uplink shared channel (PUSCH) and physical uplink control channel (PUCCH). As another example, reception device 1003 may receive sounding reference signals, which are used to facilitate frequency-dependent scheduling. As yet another example, reception device 1003 may receive downlink reference signals (DLRS). Thus, channel estimation component 1008 may receive different types of reference data in order to generate channel estimation data, which may be used by other components of reception device 1003.

Precoding matrix indication component 1010 may generate precoding data, such precoding matrix indicators (PMIs), based on the channel estimation data, The precoding data may be provided to transmission device 1001 in order for transmission device 1001 to apply different precoders, as discussed above.

Rank indication component may generate rank indication data (e.g., a rank indicator (RI)) based on the channel estimation data. The rank indication data may indicate the number of symbols that can be transmitted at once by transmission device 1001.

Reception device 1003 receives data transmitted by data transmission device 1001. For example, reception device 1003 may receive repeated data transmissions according to different precoding patterns, as discussed above with respect to FIGS. 9A-9D. Postcoding component 1014 reverses the effect of the precoding performed by precoding component 1006 of transmission device 1001. Thereafter, layer demapping component 1016 combines the data transmitted on different layers and then demodulation component 1018 demodulates the data (e.g., back to a bitstream) to complete the transmission process.

In some examples, transmission device 1001 may be a user equipment, as described above with respect to FIGS. 1 and 4, or a communication device as described in FIG. 11, below. In other examples, transmission device 1001 may be a base station, as described above with respect to FIGS. 1 and 4.

Figure 11:
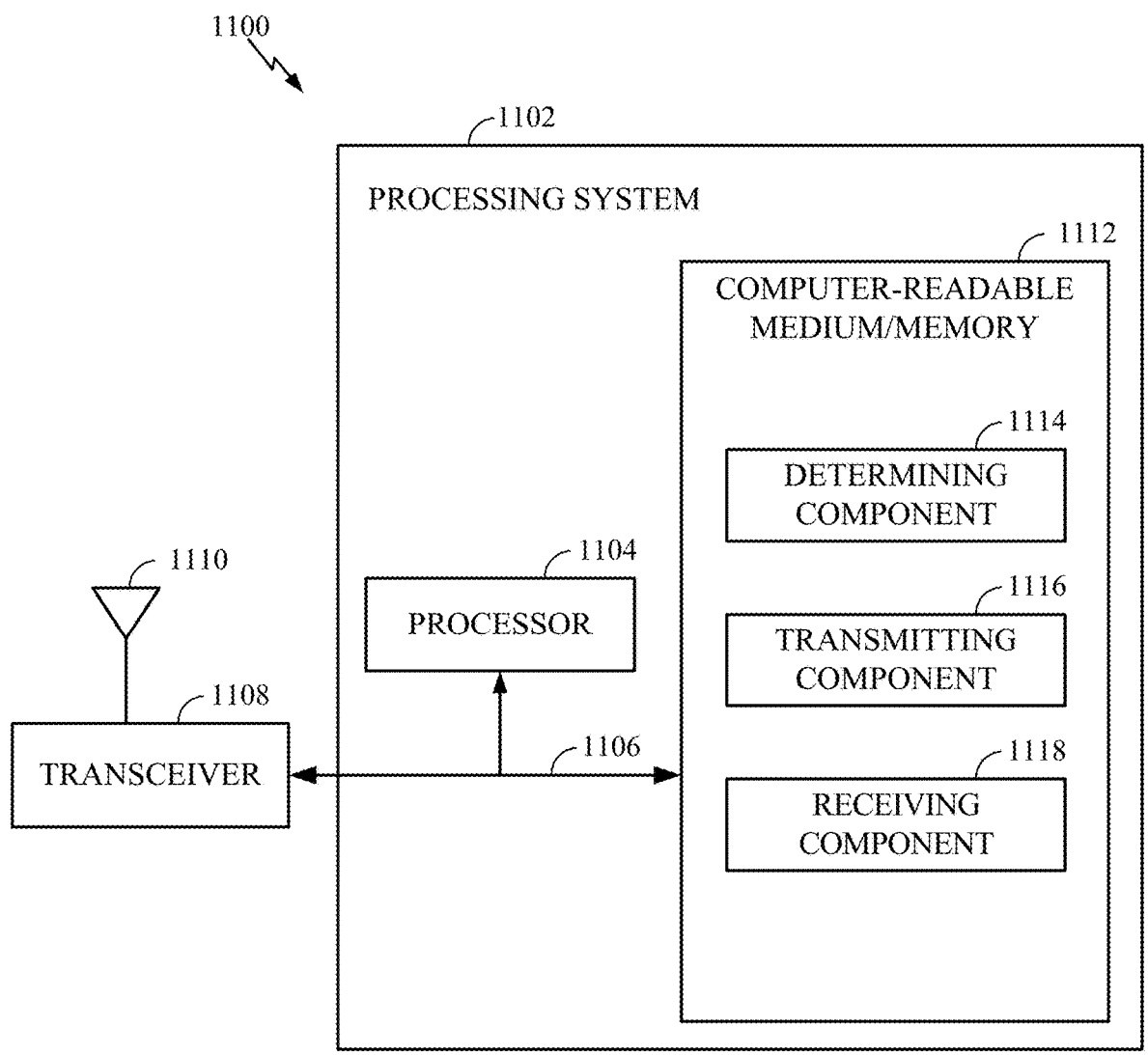
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated and described with respect to FIGS. 8 and 9A-9D. The communications device 1100 includes a processing system 1102 coupled to a transceiver 1108. The transceiver 1108 is configured to transmit and receive signals for the communications device 1100 via an antenna 1110, such as the various signals described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/ memory 1112 is configured to store instructions that when executed by processor 1104, cause the processor 1104 to perform the operations illustrated and described with respect to FIGS. 8 and 9A-9D, or other operations for performing the various techniques discussed herein.

In certain aspects, the processing system 1102 further includes a determining component 1114 for performing the operations illustrated and described with respect to FIGS. 8 and 9A-9D. Additionally, the processing system 1102 includes a transmitting component 1116 for performing the operations illustrated and described with respect to FIGS. 8 and 9A-9D. Additionally, the processing system 1102 includes a receiving component 1118 for performing the operations illustrated in illustrated and described with respect to FIGS. 8 and 9A-9D. The determining component 1114, transmitting component 1116, and receiving component 1118 may be coupled to the processor 1104 via bus 1106. In certain aspects, the determining component 1114, transmitting component 1116, and receiving component 1118 may be hardware circuits. In certain aspects, the determining component 1114, transmitting component 1116, and receiving component 1118 may be software components that are executed and run on processor 1104.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

EXAMPLE EMBODIMENTS

Embodiment 1

A method of transmitting data from a device in a wireless communication network, includes: determining a number of repetitions to transmit data in the wireless communication network; determining a precoding pattern that specifies a precoder to be applied to each repetition of the number of repetitions; and transmitting the data according to the number of repetitions and according to the precoding pattern.

Embodiment 2

The method of Embodiment 1, further comprising: performing a number of channel estimations for use in transmitting the data, wherein the number of channel estimations depends on a number of different precoders specified in the precoding pattern.

Embodiment 3

The method of Embodiments 1 or 2, wherein the precoding pattern specifies at least a first precoder associated with a first subchannel and a second precoder associated with a second subchannel.

Embodiment 4

The method of any of Embodiment 3, wherein transmitting the data according to the precoding pattern comprises interleaving transmissions of the data on the first subchannel with transmissions of the data on the second subchannel.

Embodiment 5

The method of Embodiment 3, wherein transmitting the data according to the precoding pattern comprises repeating all transmissions of the data on the first subchannel before any transmissions of the data on the second subchannel.

Embodiment 6

The method of any of Embodiments 3-5, wherein at least one of the first subchannel and the second subchannel comprises a physical downlink shared channel (PDSCH).

Embodiment 7

The method of any of Embodiments 3-5, wherein at least one of the first subchannel and the second subchannel comprises a physical uplink shared channel (PUSCH).

Embodiment 8

The method of any of Embodiments 1-7, furthering comprising: determining a mobility of the device; and determining the precoding pattern based on the mobility of the device.

Embodiment 9

The method of any of Embodiments 1-8, further comprising: receiving one or more precoding patterns.

Embodiment 10

The method of Embodiment 9, wherein the one or more precoding patterns are received from the wireless communication network via radio resource control (RRC) signaling.

Embodiment 11

The method of Embodiment 10, further comprising: receiving, from the wireless communication network via downlink control information (DCI) signaling, an indication of which precoding pattern of the one or more precoding patterns to use for transmitting the data.

Embodiment 12

A device configured to transmit data in a wireless communication network, comprising: a memory comprising executable instructions; and a processor in data communication with the memory and configured to execute the executable instructions to cause the device to: determine a number of repetitions to transmit data in the wireless communication network; determine a precoding pattern that specifies a precoder to be applied to each repetition of the number of repetitions; and transmit the data according to the number of repetitions and according to the precoding pattern.

Embodiment 13

The device of Embodiment 12, wherein the processor is further configured to cause the device to: perform a number of channel estimations for use in transmitting the data, wherein the number of channel estimations depends on a number of different precoders specified in the precoding pattern.

Embodiment 14

The device of Embodiments 12 or 13, wherein the precoding pattern specifies at least a first precoder associated with a first subchannel and a second precoder associated with a second subchannel.

Embodiment 15

The device of any of Embodiment 14, wherein in order to transmit the data according to the precoding pattern, the processor is further configured to cause the device to interleave transmissions of the data on the first subchannel with transmissions of the data on the second subchannel.

Embodiment 16

The device of Embodiment 14, wherein in order to transmit the data according to the precoding pattern, the processor is further configured to cause the device to repeat all transmissions of the data on the first subchannel before any transmissions of the data on the second subchannel.

Embodiment 17

The device of any of Embodiments 14-16, wherein at least one of the first subchannel and the second subchannel comprises a physical downlink shared channel (PDSCH).

Embodiment 18

The device of any of Embodiments 14-16, wherein at least one of the first subchannel and the second subchannel comprises a physical uplink shared channel (PUSCH).

Embodiment 19

The device of any of Embodiments 12-18, wherein the processor is further configured to cause the device to: determine a mobility of the device; and determine the precoding pattern based on the mobility of the device.

Embodiment 20

The device of any of Embodiments 12-19, wherein the processor is further configured to cause the device to: receive one or more precoding patterns.

Embodiment 21

The device of Embodiment 20, wherein the processor is further configured to cause the device to receive the one or more precoding patterns from the wireless communication network via radio resource control (RRC) signaling.

Embodiment 22

The device of Embodiment 21, wherein the processor is further configured to cause the device to: receive, from the wireless communication network via downlink control information (DCI) signaling, an indication of which precoding pattern of the one or more precoding patterns to use for transmitting the data.

Embodiment 23

A device configured to transmit data in a wireless communication network, comprising: means for determining a number of repetitions to transmit data in the wireless communication network; means for determining a precoding pattern that specifies a precoder to be applied to each repetition of the number of repetitions; and means for transmitting the data according to the number of repetitions and according to the precoding pattern.

Embodiment 24

The device of Embodiment 23, wherein: the precoding pattern specifies at least a first precoder associated with a first subchannel and a second precoder associated with a second subchannel, and transmitting the data according to the precoding pattern comprises interleaving transmissions of the data on the first subchannel with transmissions of the data on the second subchannel.

Embodiment 25

The device of Embodiment 23, wherein: the precoding pattern specifies at least a first precoder associated with a first subchannel and a second precoder associated with a second subchannel, and transmitting the data according to the precoding pattern comprises repeating all transmissions of the data on the first subchannel before any transmissions of the data on the second subchannel.

Embodiment 26

The device of any of Embodiments 23-25, further comprising: means for receiving one or more precoding patterns from the wireless communication network via radio resource control (RRC) signaling; and means for receiving, from the wireless communication network via downlink control information (DCI) signaling, an indication of which precoding pattern of the one or more precoding patterns to use for transmitting the data.

Embodiment 27

A non-transitory computer-readable medium comprising instructions that, when executed by a processor of a device, cause the device to perform a method of transmitting data from a device in a wireless communication network, the method comprising: determining a number of repetitions to transmit data in the wireless communication network; determining a precoding pattern that specifies a precoder to be applied to each repetition of the number of repetitions; and transmitting the data according to the number of repetitions and according to the precoding pattern.

Embodiment 28

The non-transitory computer-readable medium of Embodiment 27, wherein: the precoding pattern specifies at least a first precoder associated with a first subchannel and a second precoder associated with a second subchannel, and transmitting the data according to the precoding pattern comprises interleaving transmissions of the data on the first subchannel with transmissions of the data on the second subchannel.

Embodiment 29

The non-transitory computer-readable medium of Embodiment 27, wherein: the precoding pattern specifies at least a first precoder associated with a first subchannel and a second precoder associated with a second subchannel, and transmitting the data according to the precoding pattern comprises repeating all transmissions of the data on the first subchannel before any transmissions of the data on the second subchannel.

Embodiment 30

The non-transitory computer-readable medium of any of Embodiments 27-29, wherein the method further comprises: receiving one or more precoding patterns from the wireless communication network via radio resource control (RRC) signaling; and receiving, from the wireless communication network via downlink control information (DCI) signaling, an indication of which precoding pattern of the one or more precoding patterns to use for transmitting the data.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated and described with respect to FIGS. 8 and 9A-9D.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of transmitting data from a device in a wireless communication network, comprising:
   determining a number of repetitions to transmit data in the wireless communication network;
   determining a precoding pattern that specifies a precoder to be applied to each repetition of the number of repetitions, wherein the precoding pattern specifies at least:
      a first precoder associated with a first antenna and a first type of channel; and
      a second precoder associated with a second antenna and a second type of channel different from the first type of channel; and
   transmitting the data according to the number of repetitions and according to the precoding pattern,
   wherein transmitting the data according to the precoding pattern comprises interleaving transmissions of the data on the first type of channel with the first antenna with transmissions of the data on the second type of channel with the second antenna for the number of repetitions.

2. The method of claim 1, further comprising:
   performing a number of channel estimations for use in transmitting the data,
   wherein the number of channel estimations depends on a number of different precoders specified in the precoding pattern.

3. The method of claim 1, wherein at least one of the first type of channel or the second type of channel comprises a physical downlink shared channel (PDSCH).

4. The method of claim 1, wherein at least one of the first type of channel or the second type of channel comprises a physical uplink shared channel (PUSCH).

5. The method of claim 1, furthering comprising:
   determining a mobility of the device; and
   determining the precoding pattern based on the mobility of the device.

6. The method of claim 1, further comprising: receiving one or more precoding patterns.

7. The method of claim 6, wherein the one or more precoding patterns are received from the wireless communication network via radio resource control (RRC) signaling.

8. The method of claim 7, further comprising: receiving, from the wireless communication network via downlink control information (DCI) signaling, an indication of which precoding pattern of the one or more precoding patterns to use for transmitting the data.

9. The method of claim 1, wherein the first type of channel and the second type of channel comprise a same physical channel or a same logical channel.

10. The method of claim 1 wherein the device in the wireless communication network is one of a base station or a user equipment.

11. The method of claim 1, wherein:
   the transmissions of the data on the first type of channel with the first antenna and the transmissions of the data on the second type of channel with the second antenna are interleaved using a plurality of slots, and
   the slots occur successively.

12. A device configured to transmit data in a wireless communication network, comprising:
a memory comprising executable instructions; and
a processor in data communication with the memory and configured to execute the executable instructions to cause the device to:
determine a number of repetitions to transmit data in the wireless communication network;
determine a precoding pattern that specifies a precoder to be applied to each repetition of the number of repetitions, wherein the precoding pattern specifies at least:
a first precoder associated with a first antenna and a first type of channel; and
a second precoder associated with a second antenna and a second type of channel different from the first type of channel;
and
transmit the data according to the number of repetitions and according to the precoding pattern,
wherein in order to transmit the data according to the precoding pattern, the processor is further configured to cause the device to interleave transmissions of the data on the first type of channel with the first antenna with transmissions of the data on the second type of channel with the second antenna for the number of repetitions.

13. The device of claim 12, wherein the processor is further configured to cause the device to:
perform a number of channel estimations for use in transmitting the data,
wherein the number of channel estimations depends on a number of different precoders specified in the precoding pattern.

14. The device of claim 12, wherein at least one of the first type of channel or the second type of channel comprises a physical downlink shared channel (PDSCH).

15. The device of claim 12, wherein at least one of the first type of channel or the second type of channel comprises a physical uplink shared channel (PUSCH).

16. The device of claim 12, wherein the processor is further configured to cause the device to:
determine a mobility of the device; and
determine the precoding pattern based on the mobility of the device.

17. The device of claim 12, wherein the processor is further configured to cause the device to: receive one or more precoding patterns.

18. The device of claim 17, wherein the processor is further configured to cause the device to receive the one or more precoding patterns from the wireless communication network via radio resource control (RRC) signaling.

19. The device of claim 18, wherein the processor is further configured to cause the device to: receive, from the wireless communication network via downlink control information (DCI) signaling, an indication of which precoding pattern of the one or more precoding patterns to use for transmitting the data.

20. The device of claim 12, wherein the first type of channel and the second type of channel comprise a same physical channel or a same logical channel.

21. The device of claim 12, wherein the device in the wireless communication network is one of a base station or a user equipment.

22. The device of claim 12, wherein:
the processor is further configured to cause the device to use a plurality of slots when performing interleaved transmission of data on the first type of channel with the first antenna and data on the second type of channel with the second antenna, and
the slots occur successively.

23. A device configured to transmit data in a wireless communication network, comprising:
means for determining a number of repetitions to transmit data in the wireless communication network;
means for determining a precoding pattern that specifies a precoder to be applied to each repetition of the number of repetitions, wherein the precoding pattern specifies at least;
a first precoder associated with a first antenna and a first type of channel; and
a second precoder associated with a second antenna and a second type of channel different from the first type of channel; and
means for transmitting the data according to the number of repetitions and according to the precoding pattern,
wherein transmitting the data according to the precoding pattern comprises interleaving transmissions of the data on the first type of channel with the first antenna with transmissions of the data on the second type of channel with the second antenna for the number of repetitions.

24. The device of claim 23, further comprising:
means for receiving one or more precoding patterns from the wireless communication network via radio resource control (RRC) signaling; and
means for receiving, from the wireless communication network via downlink control information (DCI) signaling, an indication of which precoding pattern of the one or more precoding patterns to use for transmitting the data.

25. The device of claim 23, wherein at least one of the first type of channel or the second type of channel comprises one of a physical downlink shared channel (PDSCH) or a physical uplink shared channel (PUSCH).

26. The device of claim 23, wherein the device in the wireless communication network is one of a base station or a user equipment.

27. A non-transitory computer-readable medium comprising instructions that, when executed by a processor of a device, cause the device to perform a method of transmitting data from a device in a wireless communication network, the method comprising:
determining a number of repetitions to transmit data in the wireless communication network;
determining a precoding pattern that specifies a precoder to be applied to each repetition of the number of repetitions, wherein the precoding pattern specifies at least:
a first precoder associated with a first antenna and a first type of channel; and
a second precoder associated with a second antenna and a second type of channel different from the first type of channel; and
transmitting the data according to the number of repetitions and according to the precoding pattern,
wherein transmitting the data according to the precoding pattern comprises interleaving transmissions of the data on the first type of channel with the first antenna with transmissions of the data on the second type of channel with the second antenna for the number of repetitions.

28. The non-transitory computer-readable medium of claim 27, wherein the method further comprises:

receiving one or more precoding patterns from the wireless communication network via radio resource control (RRC) signaling; and receiving, from the wireless communication network via downlink control information (DCI) signaling, an indication of which precoding pattern of the one or more precoding patterns to use for transmitting the data.

29. The non-transitory computer-readable medium of claim 27, wherein at least one of the first type of channel or the second type of channel comprises one of a physical downlink shared channel (PDSCH) or a physical uplink shared channel (PUSCH).

30. The non-transitory computer-readable medium of claim 27, wherein the device in the wireless communication network is one of a base station or a user equipment.

* * * * *